United States Patent
Sams et al.

(10) Patent No.: US 12,352,371 B2
(45) Date of Patent: Jul. 8, 2025

(54) FLUID CONTROL DEVICE AND METHOD FOR FLUID CONTROL IN AN EXTREME ULTRAVIOLET LIGHT SOURCE

(71) Applicant: ASML Netherlands B.V., Veldhoven (NL)

(72) Inventors: Benjamin Andrew Sams, San Diego, CA (US); Dietmar Uwe Herbert Trees, San Diego, CA (US); Theodorus Wilhelmus Driessen, San Diego, CA (US); Bob Rollinger, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 700 days.

(21) Appl. No.: 17/609,842

(22) PCT Filed: May 22, 2020

(86) PCT No.: PCT/EP2020/064273
§ 371 (c)(1),
(2) Date: Nov. 9, 2021

(87) PCT Pub. No.: WO2020/239625
PCT Pub. Date: Dec. 3, 2020

(65) Prior Publication Data
US 2022/0213981 A1 Jul. 7, 2022

Related U.S. Application Data

(60) Provisional application No. 62/852,685, filed on May 24, 2019.

(51) Int. Cl.
*F16K 51/02* (2006.01)
*H05G 2/00* (2006.01)

(52) U.S. Cl.
CPC ............. *F16K 51/02* (2013.01); *H05G 2/006* (2013.01)

(58) Field of Classification Search
CPC ................................ F16K 51/02; H05G 2/006
See application file for complete search history.

(56) References Cited

U.S. PATENT DOCUMENTS

| 6,041,817 A | 3/2000 | Guertin |
| 7,165,954 B2 | 1/2007 | Kim |

(Continued)

FOREIGN PATENT DOCUMENTS

| CN | 201034208 Y | 3/2008 |
| CN | 204025766 U | 12/2014 |

(Continued)

OTHER PUBLICATIONS

Chiara Giovanardi, European International Searching Authority, International Search Report and Written Opinion, counterpart PCT Application No. PCT/EP2020/064273, mailed Sep. 28, 2020, 18 pages total.

(Continued)

*Primary Examiner* — Kevin R Barss
(74) *Attorney, Agent, or Firm* — DiBerardino McGovern IP Group LLC

(57) ABSTRACT

A fluid control device (100) includes a structure (120) defining a valve cavity, a first fluid port (135), a second fluid port (140), and a third fluid port (145) configured to be fluidly coupled to a hermetic interior (105) of a body; and a plunger valve (130) within the valve cavity and configured to move between first and second modes while maintaining the hermetic interior of the body. In the first mode, the plunger valve is open such that a first fluid flow path is open between the hermetic interior and the first fluid port and fluid is free to pass between the first fluid port and the hermetic (Continued)

interior. In the second mode, the plunger valve is closed such that the first fluid port is blocked from the hermetic interior by the plunger valve and a second fluid flow path is open between the hermetic interior and the second fluid port.

23 Claims, 10 Drawing Sheets

(56) References Cited

U.S. PATENT DOCUMENTS

| | | |
|---|---|---|
| 2005/0207901 A1 | 9/2005 | Klobucar et al. |
| 2006/0191636 A1 | 8/2006 | Choi |
| 2013/0319466 A1* | 12/2013 | Mizoguchi .......... G03F 7/70925 134/21 |
| 2017/0053780 A1* | 2/2017 | Iwamoto ........... H01J 37/32449 |
| 2017/0064799 A1* | 3/2017 | Yabu ...................... H05G 2/006 |
| 2018/0157179 A1* | 6/2018 | Wu ......................... H05G 2/006 |
| 2019/0137882 A1 | 5/2019 | Lai et al. |

FOREIGN PATENT DOCUMENTS

| | | |
|---|---|---|
| EP | 1179718 A1 | 2/2002 |
| JP | H0241750 A | 2/1990 |
| JP | H0581348 B2 | 11/1993 |
| JP | 2008248759 A | 10/2008 |
| KR | 20040098457 A | 11/2004 |
| KR | 100513048 B1 | 9/2005 |
| KR | 20180072067 A | 6/2018 |
| KR | 20190023453 A | 3/2019 |
| TW | 201918797 A | 5/2019 |

OTHER PUBLICATIONS

D.N. Prasad et al., "Development of high pressure-high vacuum-high conductance piston valve for gas-filled radiation detectors," J. Phys.: Conf. Ser. 114 012055 (2008).

* cited by examiner

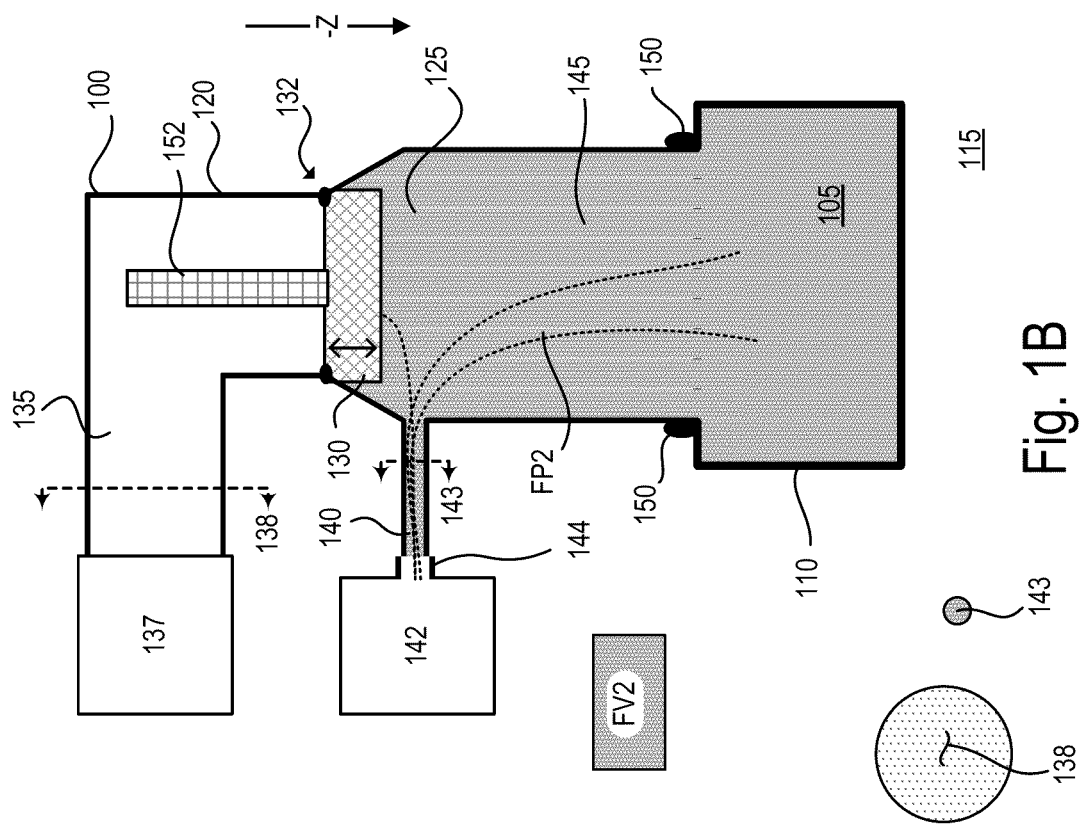
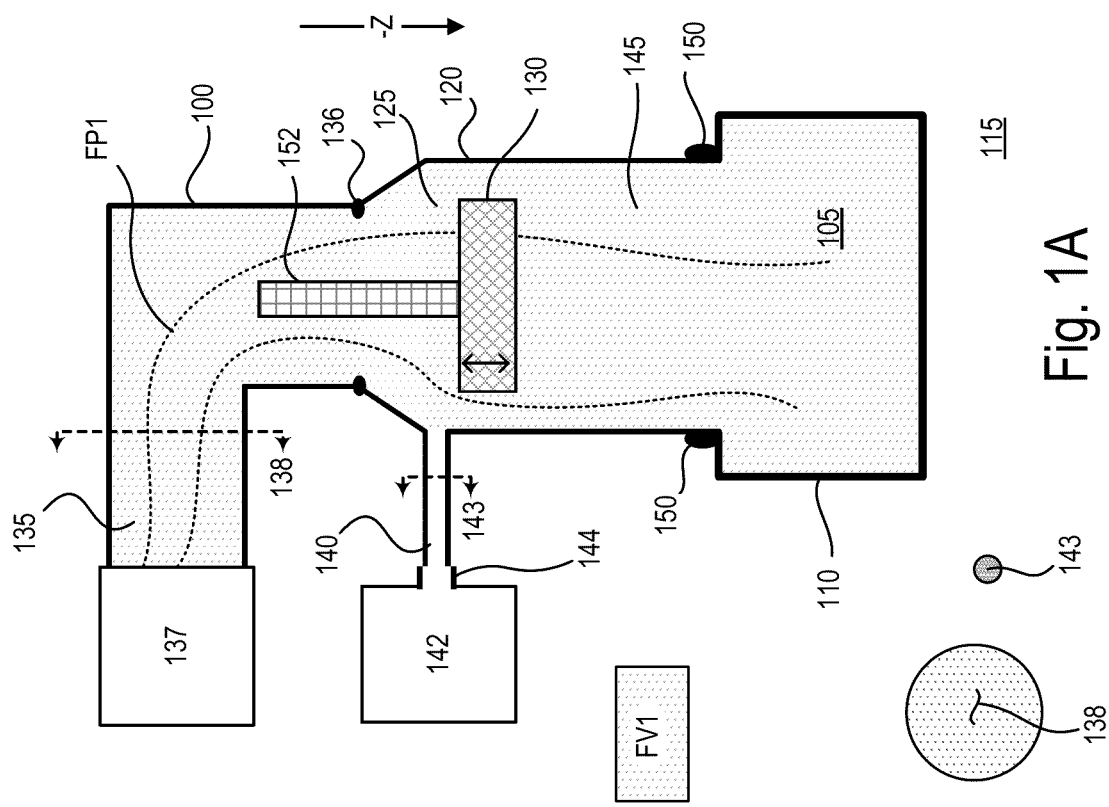
Fig. 1B
Fig. 1A

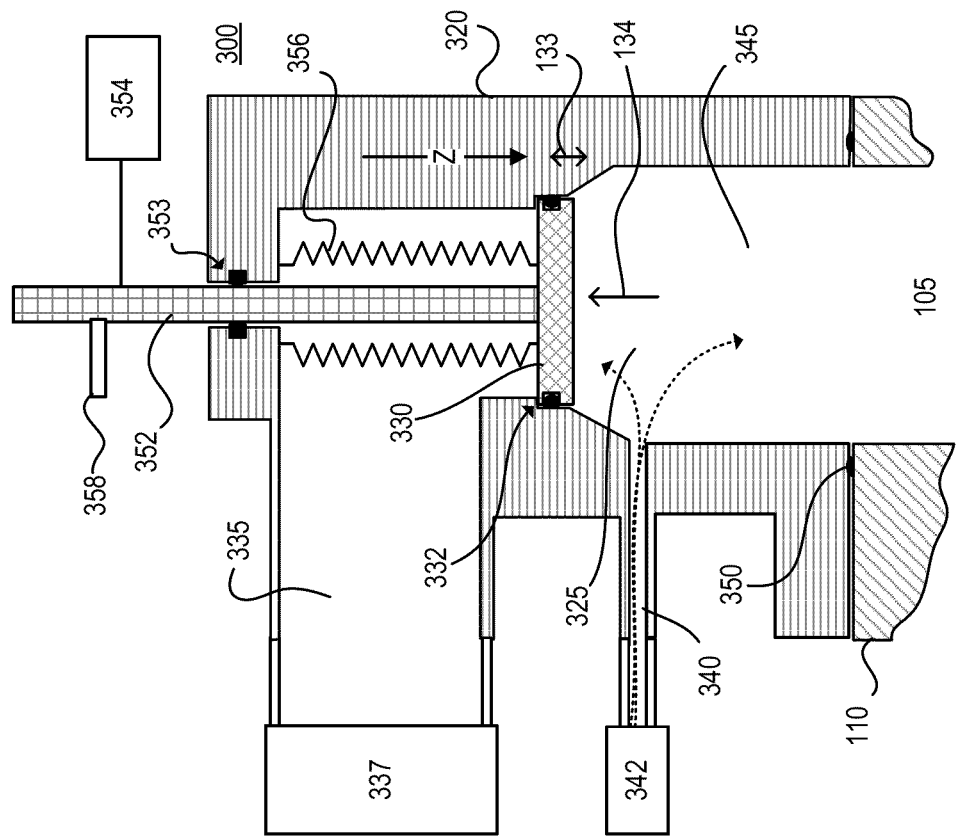
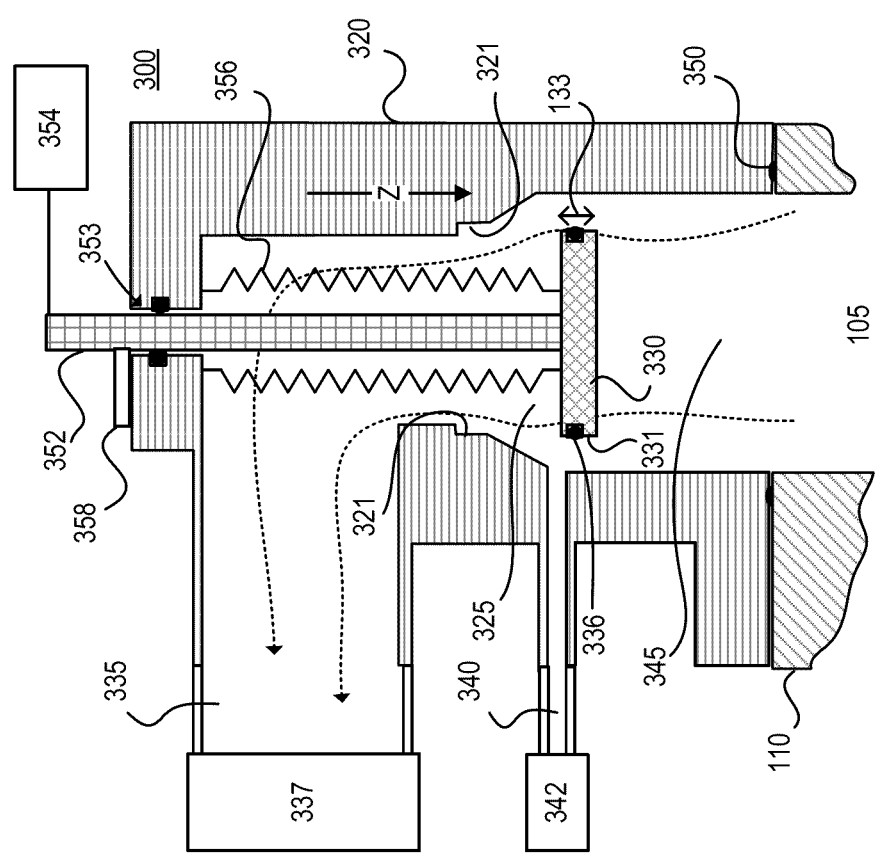
Fig. 3B
Fig. 3A

FLUID CONTROL DEVICE AND METHOD FOR FLUID CONTROL IN AN EXTREME ULTRAVIOLET LIGHT SOURCE

CROSS REFERENCE TO RELATED APPLICATIONS

This application claims priority to U.S. Application No. 62/852,685, filed May 24, 2019 and titled FLUID CONTROL DEVICE AND METHOD FOR FLUID CONTROL IN AN EXTREME ULTRAVIOLET LIGHT SOURCE, which is incorporated herein in its entirety by reference.

TECHNICAL FIELD

The disclosed subject matter relates to a fluid control device and a method for fluid control that can be used in a laser produced plasma extreme ultraviolet light source.

BACKGROUND

Extreme ultraviolet (EUV) light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In some general aspects, a two-mode fluid control device includes: a structure defining a valve cavity and three fluid ports fluidly coupled to the valve cavity, a first fluid port configured to be fluidly coupled to a vacuum pump, a second fluid port configured to be fluidly coupled to a fluid supply, and a third fluid port configured to be fluidly coupled to a hermetic interior of a body; and a single plunger valve within the valve cavity and configured to move between first and second modes while maintaining the hermetic interior of the body. The first mode corresponds to a vacuum mode in which the plunger valve is open such that a first fluid flow path is open between the hermetic interior and the first fluid port and fluid is free to pass between the vacuum pump and the hermetic interior. The second mode corresponds to a pressure mode in which the plunger valve is closed such that the first fluid port is blocked from the hermetic interior by the plunger valve and a second fluid flow path is open between the hermetic interior and the second fluid port.

Implementations can include one or more of the following features. For example, the first fluid port can have a first cross-sectional area that provides a first fluid conductance and the second fluid port can have a second cross-sectional area that provides a second fluid conductance, the first cross-sectional area being greater than the second cross-sectional area. The first cross-sectional area can be at least twice the size of, at least five times the size of, at least ten times the size of, at least fifty times the size of, or about one hundred times the size of the second cross-sectional area.

The second mode can be a default mode in which the plunger valve is at its equilibrium position. The fluid control device can include a biasing device in physical communication with the plunger valve and configured to bias the plunger valve to the second mode.

When the plunger valve is in the second mode and is closed, a seal can be formed that separates the vacuum pump from the hermetic interior and the plunger valve is exposed to a pressure above atmospheric pressure. The seal can strengthen or remain at a constant strength while the plunger valve is in the second mode due to pressure applied against the plunger valve from the fluid supply.

In the vacuum mode, a pressure within the hermetic interior can be maintained below atmospheric pressure, and in the pressure mode, a pressure within the hermetic interior can be maintained above atmospheric pressure. In the vacuum mode, a pressure within the hermetic interior can be maintained at high or ultra-high vacuum in which molecular flow dominates within first fluid flow path and the hermetic interior. In the vacuum mode, a pressure within the hermetic interior can be maintained below 101 kilopascals (kPa), and in the pressure mode, a pressure within the hermetic interior can be maintained above 10 megapascals (MPa). In various implementations, the vacuum mode is suitable to support pressures below, for example, 10 kPa, 3 kPa, or 1 kPa. In various implementations, the pressure mode is suitable to support pressures above, for example, 5 MPa, 10 MPa, or 24 MPa.

Fluid can be free to pass from the hermetic interior to the vacuum pump when the plunger valve is in the first mode.

The plunger valve can be configured to move between the first and second modes by linearly translating between the first and second modes without rotation. The fluid control device can include an actuator in physical communication with the plunger valve and configured to control the translation of the plunger valve between the first and second modes. The actuation can include linear motion by a rotatable threaded rod, a push/pull bar or cable, a lever, a solenoid, or a piston (that can be pneumatic or hydraulic).

A hermetic seal can be formed between the structure and the body.

The second fluid port can be fluidly coupled to a fluid supply of gas. The gas can be an inert gas that includes one or more of a noble gas and a molecular gas.

While in the first mode, a first fluid volume that includes the hermetic interior and a first portion of the valve cavity can be formed. And, while in the second mode, a second fluid volume that includes the hermetic interior and a second portion of the valve cavity can be formed, the second fluid volume being smaller than the first fluid volume.

The plunger valve can be a solid volume or mass of material such that any fluid flow path remains exterior to the plunger valve.

In other general aspects, a target apparatus for an extreme ultraviolet (EUV) light source includes a target generator including a reservoir defining a hollow interior configured to contain target material that produces EUV light when in a plasma state and a nozzle structure defining an opening that is in fluid communication with the hollow interior; and a two-mode valve device hermetically sealed to the reservoir. The two-mode valve device hermetically includes: a structure defining a valve cavity and three fluid ports fluidly coupled to the valve cavity, a first fluid port of a first extent being fluidly coupled to a vacuum pump, a second fluid port of a second extent being fluidly coupled to a fluid supply, the first extent being at least ten times the size of the second extent, and a third fluid port being fluidly coupled to the reservoir interior; and a single plunger valve within the valve cavity and configured to move between first and second modes without opening the reservoir interior. The first mode corresponds to a vacuum mode in which the plunger valve is open such that a first fluid flow path is open between the reservoir interior and the first fluid port. The second mode corresponds to a pressure mode in which the plunger valve is closed such that a second fluid flow path is open between the reservoir interior and the second fluid port.

Implementations can include one or more of the following features. For example, the hollow interior can be held at a pressure above 10 megapascals (MPa) when the plunger valve is in the pressure mode. The pressure within the hollow interior of the reservoir can be greater than a pressure at the exterior when the plunger valve is in the pressure mode.

A pressure within the hollow interior can be controlled at least in part by the mode of the two-mode valve device.

The first fluid port can be hermetically separated from the hollow interior by the plunger valve when the plunger valve is in the second mode.

In other general aspects, a method includes controlling a fluid state in a hermetic interior of a body using one of two operationally-isolated control modes, the two control modes including a vacuum control mode and a high pressure control mode. In the vacuum control mode, fluid is conducted from the hermetic interior of the body at a first conductance such that the hermetic interior reaches a target vacuum pressure. In the high pressure control mode, fluid is conducted into the hermetic interior of the body at a second conductance such that the hermetic interior reaches a target high pressure that is above atmospheric pressure, the first conductance being at least twice the second conductance. The method also includes switching between the vacuum control mode and the high pressure control mode including moving a single plunger valve between a first mode corresponding to the vacuum control mode in which the plunger valve is open and a second mode corresponding to the high pressure control mode in which the plunger valve is closed and forms a seal. The hermetic interior of the body is maintained throughout the switching.

Implementations can include one or more of the following features. For example, the method can also include, prior to conducting fluid into the hermetic interior of the body at the second rate of flow while in the high pressure control mode, forming the seal to thereby separate a vacuum pump from the hermetic interior. The fluid can be conducted into the hermetic interior of the body at the second rate of flow while in the high pressure control mode by exposing the plunger valve to the target high pressure.

The target vacuum pressure can be below 101 kilopascals (kPa) and fluid can be conducted from the hermetic interior of the body after switching to the vacuum control mode at the first conductance such that the hermetic interior of the body reaches the target vacuum pressure in less than four hours, less than an hour, less than 15 minutes, or less than a minute.

The switch to the vacuum control mode can include opening the plunger valve and forming a first fluid volume that includes the hermetic interior and a first portion of a valve cavity in which the plunger valve is seated. The switch to the high pressure control mode can include closing the plunger valve and forming a second fluid volume that includes the hermetic interior and a second portion of the valve cavity, the second fluid volume being smaller than the first fluid volume.

Prior to controlling the fluid state in the hermetic interior of the body, the method can include inserting a solid mass of material into an interior of the body and sealing the interior to form the hermetic interior in which the solid mass is located. The fluid state in the hermetic interior of the body can be controlled by: conducting fluid that includes one or more contaminants from the hermetic interior while in the vacuum control mode; and if the concentration of each contaminant inside the hermetic interior is below a respective threshold concentration, then closing the plunger valve to halt vacuum control mode, melting the solid mass of material, and switching to high pressure control mode after the solid mass of material has melted. The fluid can be conducted into the hermetic interior until a pressure in the hermetic interior rises above a threshold pressure at which the melted target material viscously flows out of an opening fluidly coupled to the hermetic interior during high pressure control mode.

The method can include biasing the plunger valve to the first state.

The method can include biasing the plunger valve to the second state.

The first conductance can be at least five times, at least ten times, at least fifty times, or about one hundred times the second conductance.

DESCRIPTION OF DRAWINGS

FIG. 1A is a block diagram of a fluid control device in fluid communication with and for controlling a hermetic interior of a body, the fluid control device in a vacuum mode;

FIG. 1B is a block diagram of the fluid control device of FIG. 1A in a pressure mode;

FIG. 3A is a cross-sectional illustration of an implementation of a fluid control device of FIG. 1A while in a vacuum mode;

FIG. 3B is a cross-sectional illustration of the implementation of the fluid control device of FIG. 3A while in a pressure mode;

DESCRIPTION

Figure 1C:
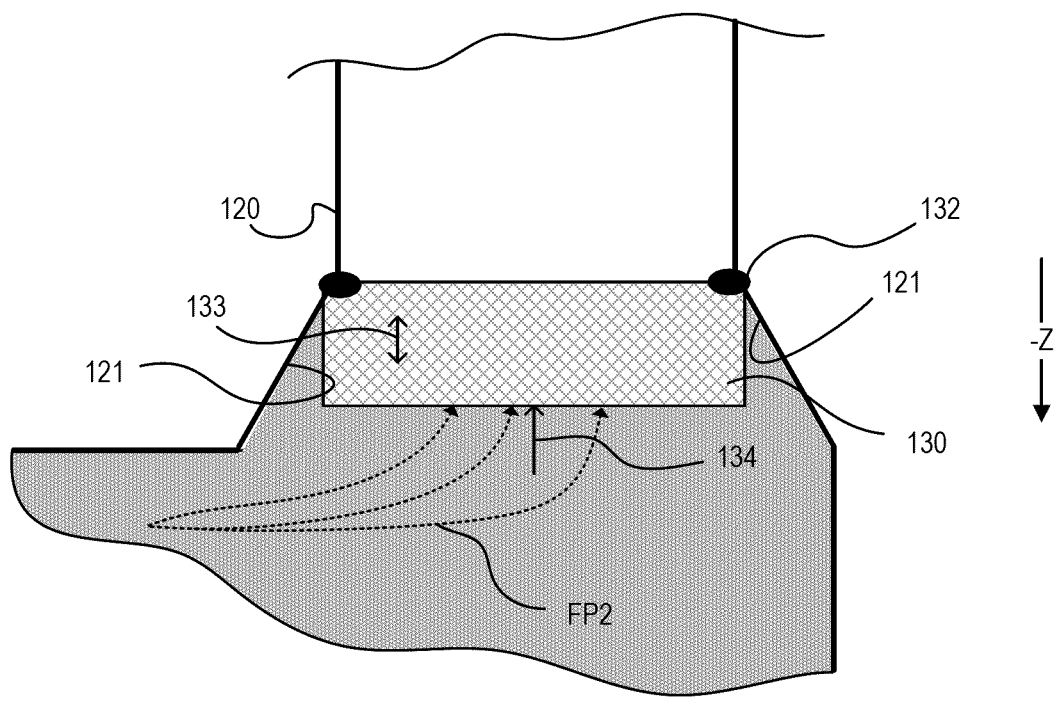
FIG. 1C is a schematic illustration of a plunger valve of the fluid control device in the pressure mode of FIG. 1B, the plunger valve being seated and movable in a valve cavity defined by a structure of the fluid control device of FIGS. 1A and 1B.

Referring to FIGS. 1A and 1B, a fluid control device 100 is configured to be in fluid communication with and is used to control a hermetic interior 105 defined within a body 110, the hermetic interior 105 being effectively sealed off or isolated from an external environment 115. The two-mode fluid control device 100 switches between two modes: an open mode in which a relatively large fluid conductance out of the hermetic interior 105 is possible and a closed mode in which a relatively smaller fluid conductance into the hermetic interior 105 is possible. The switching can be performed while maintaining the hermetic interior 105 in its hermetically-isolated state. The fluid that can be conducted into and out of the hermetic interior 105 can be in a gas state or a liquid state.

The fluid control device 100 includes a structure 120 defining a valve cavity 125 in which a single plunger valve 130 is seated and is movable. Thus, the fluid control device 100 performs the functions described herein solely with the use of only one plunger valve 130, thus reducing complexity and cost. The structure 120 defines three fluid ports 135, 140, 145 fluidly coupled to the valve cavity 125. The first fluid port 135 is configured to be fluidly coupled to a vacuum pump 137, the second fluid port 140 is configured to be fluidly coupled to a supply 142 of fluid, and the third fluid port 145 is configured to be fluidly coupled to the hermetic interior 105 of the body 110. The plunger valve 130 is within the valve cavity 125 and is configured to move between first and second modes while maintaining the hermetic interior 105 of the body 110.

The first mode, which is shown in FIG. 1A, corresponds to a vacuum mode in which the plunger valve 130 is in an open status such that a first fluid flow path FP1 is open between the hermetic interior 105 and the first fluid port 135 and fluid is free to pass between the vacuum pump 137 and the hermetic interior 105. For example, in the first mode, fluid is free to pass from the hermetic interior 105 to the vacuum pump 137. The second mode, which is shown in FIG. 1B, corresponds to a pressure mode in which the plunger valve 130 is in a closed status such that the first fluid port 135 is blocked from the hermetic interior 105 by the plunger valve 130 and a second fluid flow path FP2 is open between the hermetic interior 105 and the second fluid port 140. The plunger valve 130 is in the closed status or closed when it is sealed to the structure 120 such that fluid is unable to pass around the plunger valve 130.

Moreover, while in the first mode, a first fluid volume FV1 that includes the hermetic interior 105 and a first portion of the valve cavity 125 is formed; while in the second mode, a second fluid volume FV2 that includes the hermetic interior 105 and a second and smaller portion of the valve cavity 125 is formed. The first fluid volume FV1 includes the first fluid port 135, the valve cavity 125, the third fluid port 145, and the hermetic interior 105. The second fluid volume FV2 includes the valve cavity 125, the second fluid port 140, the third fluid port 145, and the hermetic interior 105. The second fluid volume FV2 is smaller than the first fluid volume FV1, as is evident from FIGS. 1A and 1B. The second fluid volume FV2 does not include the first fluid port 135.

The structure 120 is a suitably rigid solid structure that is able to maintain both a vacuum (while in the vacuum mode) that is less than atmospheric pressure and a high pressure that is greater than atmospheric pressure (when in the pressure mode). The vacuum maintained in the hermetic interior 105 and also in the valve cavity 125 during vacuum mode can be a high or ultra-high vacuum in which molecular flow dominates within first fluid flow path FP1 and the hermetic interior 105. For example, in the vacuum mode, a pressure within the hermetic interior 105 can be maintained or held below 101 kilopascals (kPa). Moreover, the pressure maintained in the hermetic interior 105 and the valve cavity 125 during the pressure mode can be above atmospheric pressure, or can be above 10 megapascals (MPa).

Thus, the structure 120 (including the parts of the structure 120 that form the fluid ports 135, 140, 145) should be made of a material that has low or minimal outgassing such as stainless steel, aluminum, titanium, for example.

The plunger valve 130 is controllable to move between the two modes, and when in the second mode, the plunger valve 130 is sealed to an interior wall 121 (FIG. 1C) of the structure 120 to thereby prevent fluid from flowing into the first fluid port 135. The plunger valve 130 is a solid mass such that all possible fluid flow paths remain exterior to the body of the plunger valve 130 and there are not paths that pass through or within the plunger valve 130. Additionally, the plunger valve 130, like the structure 120, should be made of a rigid material that is able to withstand both a vacuum (while in the vacuum mode) that is less than atmospheric pressure and a high pressure that is greater than atmospheric pressure (when in the pressure mode) and also has low or minimal outgassing. The plunger valve 130 can be made of stainless steel, aluminum, titanium, for example.

The plunger valve 130 is configured to move between the first and second modes by linearly translating along a direction 133 (depicted by an arrow that is labeled 133 in FIG. 1C) that extends between the first and second modes. The direction 133 along which the plunger valve 130 can translate is either parallel with the +Z direction or parallel with the −Z direction. Moreover, the plunger valve 130 can be configured to perform such translation without any rotational motion. The plunger valve 130 moves under the control of an actuator 152 that maintains the position of the plunger valve 130 within the valve cavity 125 and also physically translates the plunger valve along the direction 133.

As discussed above, in the first mode, a relatively large fluid conductance out of the hermetic interior 105 is possible. A relatively large fluid conductance out of the hermetic interior 105 in the first mode means that the fluid conductance through the first fluid port 135 (which is fluidly coupled to the hermetic interior 105 in the first mode) is much greater than the fluid conductance through the second fluid port 140 (which is fluidly coupled to the hermetic interior 105 at least in the second mode). The fluid conductance through a port (such as the first and second fluid ports 135, 140) is generally proportional (and can be directly proportional) to a cross-sectional area of that port, where the cross-sectional are is taken along the plane that is perpendicular to the general direction of fluid flow through that port. Thus, a first cross-sectional area 138 in the first fluid port 135 is much larger than a second cross-sectional area 143 of the second fluid port 140. In this example, the cross section of the first and second ports 135, 140 has a circular shape, but other shapes such as, for example, polygonal or asymmetric are possible.

In some implementations, the first cross-sectional area 138 is at least twice the size of the second cross-sectional area 143; in other implementations, the first cross-sectional area 138 is at least five times the size of the second cross-sectional area 143; in still further implementations, the first cross-sectional area 138 is at least ten times the size of the second cross-sectional area 143; and in other implementations, the first cross-sectional area 138 is at least fifty times the size of the second cross-sectional area 143. Lastly, in still other implementations, the first cross-sectional area 138 is about one hundred times the size of the second cross-sectional area 143.

In order for the fluid control device 100 to maintain the hermetic interior 105 of the body 110 during switching between the first and second modes, the structure 120 forms a hermetic seal 150 with the body 110 at the location at which the structure 120 and the body 110 attached to each other. The hermetic seal 150 can be any seal that can withstand both the vacuum pressures present during the vacuum mode and the high pressures present during the high pressure mode. For example, the hermetic seal 150 can be a gasket seal between the structure 120 and the body 110, in which the gasket is made of soft metal such as copper and the edges of the structure 120 and the body 110 that sandwich the gasket have a knife edge to thereby maintain integrity in the ultra-high vacuum range.

The vacuum pump 137 can be any vacuum pump suitable to remove matter from the hermetic interior 105 so that a pressure within the hermetic interior 105 drops below a threshold pressure sufficiently quickly and adequately to support operating requirements on the hermetic interior 105. In the example above, in which the threshold pressure is in the high or ultra-high vacuum range, a suitable vacuum pump 137 can include one or more of the following type of pump: turbomolecular, ion, titanium sublimation, non-evaporative getter and/or cryopumps. Additionally, the vacuum pump 137 can include a pair of pumps that are used in distinct stages of operation. For example, the vacuum pump 137 can also include a mechanical pump that is initially fluidly coupled to the first fluid port 135 to perform a first rough pump down to an intermediate low pressure.

The fluid supply 142 can be a tank including an output port 144 that is fluidly coupled to the second fluid port 140, and a gate valve or some suitable fluid control valve can be positioned in the output port 144 to control how much fluid is directed from the fluid supply 142 to the second fluid port 140. In some implementations, the fluid control valve in the output port 144 remains open even during the vacuum mode in order to provide certain fluids to the hermetic interior 105 during the vacuum mode.

The fluid supplied by the fluid supply 142 to the hermetic interior 105 can be a fluid that is compatible for the application in which the hermetic interior 105 is used. The fluid supplied by the fluid supply 142 to the hermetic interior 105 can be a gas such as an inert gas, which can include one or more of a noble gas and a molecular gas. For example, the gas can be nitrogen, argon, a mixture of argon and hydrogen, hydrogen, or helium.

As discussed above, and as also shown in FIG. 1C, when the plunger valve 130 is in the second mode and is closed (FIG. 1B), a seal 132 is formed that separates the vacuum pump 137 from the hermetic interior 105, such seal 132 being formed by compressing an elastic member 136 (FIG. 1A) between the plunger valve 130 and a wall or walls of the structure 120, such as the narrowing wall 121 of the structure 120. The seal 132 is formed from a squeezing force applied between the plunger valve 130 and the narrowing wall 121 of the structure 120 that is directed away (shown by an arrow labeled 134) from the hermetic interior 105 generally along the −Z direction.

Moreover, in this second mode, the plunger valve 130 is exposed to a pressure above atmospheric pressure (and can be substantially higher than atmospheric pressure) at the side facing the hermetic interior 105 due to the pressure from the fluid in the second fluid flow path FP2. Thus, the pressure applied to the plunger valve 130 from the fluid supply 142 applies an additional force to the plunger valve 130 that, depending on the design of the seal 132, adds to the force along the direction 134, and this additional force can strengthen or maintain the seal 132 between the plunger valve 130 and the wall of the structure 120 and/or impart a greater force that maintains the plunger valve 130 in the second mode and closed.

The seal 132 shown in FIGS. 1B and 1C is depicted in a generic manner. In various implementations, the seal 132 can be a face seal, a conical seal, or a piston-bore seal, or any modifications to these seals. The seal 132 needs to be able to withstand many cycling motions of the plunger valve 132 between the two modes of operation without requiring the elastic member 136 to be replaced.

Figure 2A:
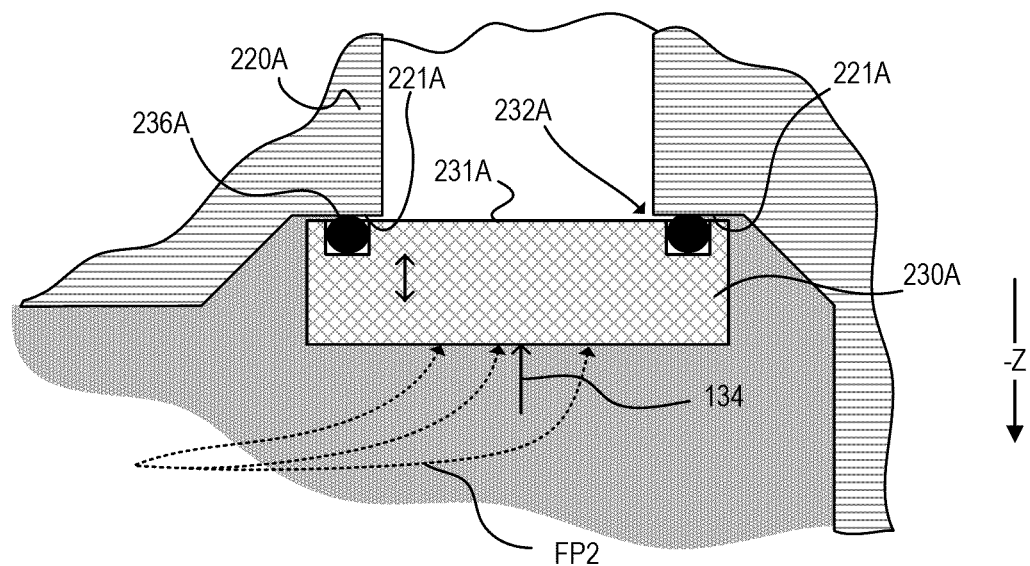
FIG. 2A is a schematic illustration of an implementation of a face seal formed between the plunger valve and the structure of the fluid control device of FIGS. 1B and 1C.

Referring to FIG. 2A, in some implementations, the seal 132 is a face seal 232A. The face seal 232A is a seal in which two parallel surfaces compress an elastic member 236A (gasket) along the sealing direction (which is parallel with the Z direction), where the elastic member 236A is seated in an O-ring groove formed in a wall 231A of the plunger valve 230A. Specifically, the elastic member 236A is compressed between an interior wall 221A of the structure 220A and the wall 231A (which is an axial face) of the plunger valve 230A. In this implementation, increasing the pressure along the direction 134 (due to the fluid flow from the fluid supply 142) compresses the gasket 236A and increases the performance of the seal 232A. The elastic material of the gasket 232A may need to be protected from excess strain that could lead to degradation or failure of the seal 232A. This protection can be provided by a hard stop that limits the compression, such as using an O-ring groove formed in the wall 231A having a specific depth. Additionally, in this implementation, the additional force from the fluid flow imparts a greater force that maintains the plunger valve 230A in the second mode and therefore closed.

Figure 2B:
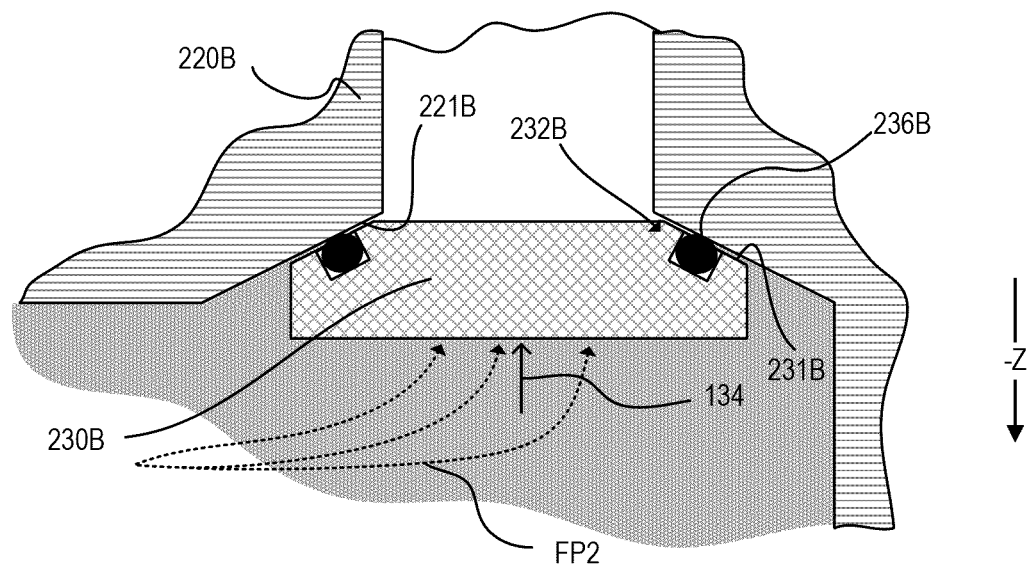
FIG. 2B is a schematic illustration of an implementation of a conical seal formed between the plunger valve and the structure of the fluid control device of FIGS. 1B and 1C.

Referring to FIG. 2B, in other implementations, the seal 132 is a conical seal 232B. In the conical seal 232B, a plunger valve 230B is designed with a draft angle (that is larger on the side at which pressure is applied and thus is larger facing the fluid port 145) at a wall 231B that matches the conical shape of interior wall 221B. The elastic member 236B (which can be a gasket) can be seated in an O-ring groove formed in the wall 231B. In this implementation, increasing the pressure along the direction 134 (due to the fluid flow from the fluid supply 142) also compresses the gasket 236B and increases the performance of the seal 232B. The elastic material of the elastic member 232B may need to be protected from excess strain that could lead to degradation or failure of the seal 232B. This protection can be provided by a hard stop that limits the compression, such as using an O-ring groove formed in the wall 231B having a specific depth. Additionally, in this implementation, the additional force from the fluid flow imparts a greater force that maintains the plunger valve 230B in the second mode and therefore closed.

Figure 3C:
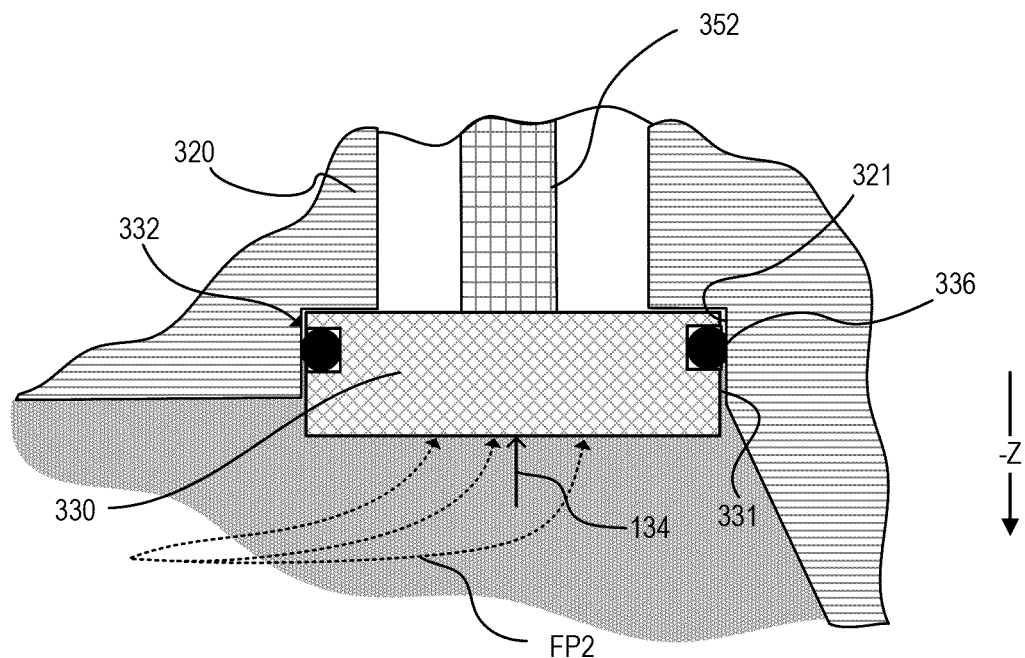
FIG. 3C is a schematic illustration of a plunger valve of the fluid control device in the pressure mode of FIG. 3B, the plunger valve being seated and movable in a valve cavity defined by a structure of the fluid control device of FIGS. 3A and 3B and showing a piston-bore type seal formed between the plunger valve and the structure.

Referring to FIGS. 3A-3C, an implementation 300 of the fluid control device 100 includes a plunger valve 330 seated in a valve cavity 325 defined within a structure 320 that is hermetically sealed by way of seal 350 to the body 110. In this implementation, as shown more clearly in FIG. 3C, a seal 332 is formed by compressing a sealing mechanism (which can be an elastic member) 336 between a wall 331 (which is a radial sidewall) of the plunger valve 330 and an interior cylindrical wall 321 of the structure 320. The seal 332 is a part of a piston-bore type seal, in which the sealing mechanism 336 seals radially between the plunger valve 330 and the interior wall 321.

The structure 320 includes the three ports 335, 340, 345 in fluid communication with respective vacuum pump 337, fluid supply 342, and hermetic interior 105. As with the fluid control device 100, the plunger valve 330 is configured to move between two modes by translating along the direction 133 (depicted by the arrow) that extends between the first and second modes and is either parallel with the +Z direction or parallel with the −Z direction. Moreover, the plunger valve 330 performs such translation without any rotational motion (that is, rotational motion about the Z direction).

The fluid control device 300 further includes an actuator 352 in physical communication with the plunger valve 330, the actuator 352 being configured to control the translation of the plunger valve 330 along the direction 133 between the first and second modes. The movement of the actuator 352 affects the translation of the plunger valve 330. The actuator 352 is moved under control of a control device 354, which can be an automatic device or a manual device. For example, the control device 354 can be a human (manual). As another example, the control device 354 can be an electromechanical device that adjusts the position of the actuator 352. The actuator 352 can be a rotatable threaded rod that linearly translates when rotated, a lever, a push/pull bar or cable, a solenoid, or a piston (which can be pneumatic or hydraulic). The motion of the actuator 352 can be restricted or limited along a direction perpendicular to the Z direction by being seated in an opening of the structure 320, and such interface between the actuator 352 and the opening of the structure 320 includes a seal 353. The combination of the seal 353 (between the actuator 352 and the structure 320) and the seal 332 (between the plunger valve 330 and the structure 320) forms the piston-bore type seal.

Moreover, the actuator 352 can be sealed within a baffle 356 that separates the valve cavity 325 from the actuator 352. That is, the valve cavity 325 does not include the volume within the baffle 356. The baffle 356 is attached at one end to the structure 320 and at another end to the plunger valve 330. The baffle 356 can optionally provide some control over the motion of the plunger valve 330 by, for example, dampening the motion of the plunger valve 330 or biasing the plunger valve 330. The baffle 356 also can be utilized to inhibit or prevent rotational motion (that is, rotational motion about the Z direction) because the baffle 356 is fixed at one end to the plunger valve 330 and at the other end to the structure 320.

In this implementation, the plunger valve 330 includes an O-ring groove for receiving the sealing mechanism 336 (such as a gasket) and this gasket 336 is pressed between the wall 321 of the structure and the sidewall 331 (labeled in FIGS. 3A and 3C) of the plunger valve 330 when the plunger valve 330 is in the second mode, as shown in FIGS. 3B and 3C.

Additionally, in some implementations, the second mode can be configured as a default mode in which the plunger valve 330 is at an equilibrium (or stable) position. For example, the plunger valve 330 can be biased along the direction 134 (away from the hermetic interior 105 and parallel with the −Z direction) to thereby rest in a position that seals the vacuum pump 337 from the hermetic interior 105. A biasing device 358 is shown in block diagram form in FIGS. 3A and 3B. The biasing device 358 can be configured to maintain the plunger valve 330 in the second mode (sealing).

In other implementations, the first mode is configured as a default mode in which the plunger valve 330 is at an equilibrium position. In these implementations, the biasing device 358 biases (or maintains) the plunger valve 330 in the first mode.

The biasing device 358 can be any device that sets the equilibrium position of the plunger valve 330. For example, the biasing device 358 can be a mechanical object able to store energy such as a spring or a piston attached to the plunger valve 330 or to the actuator 352. The resting position of the spring can correspond to the equilibrium position of the plunger valve 330.

Figure 4:
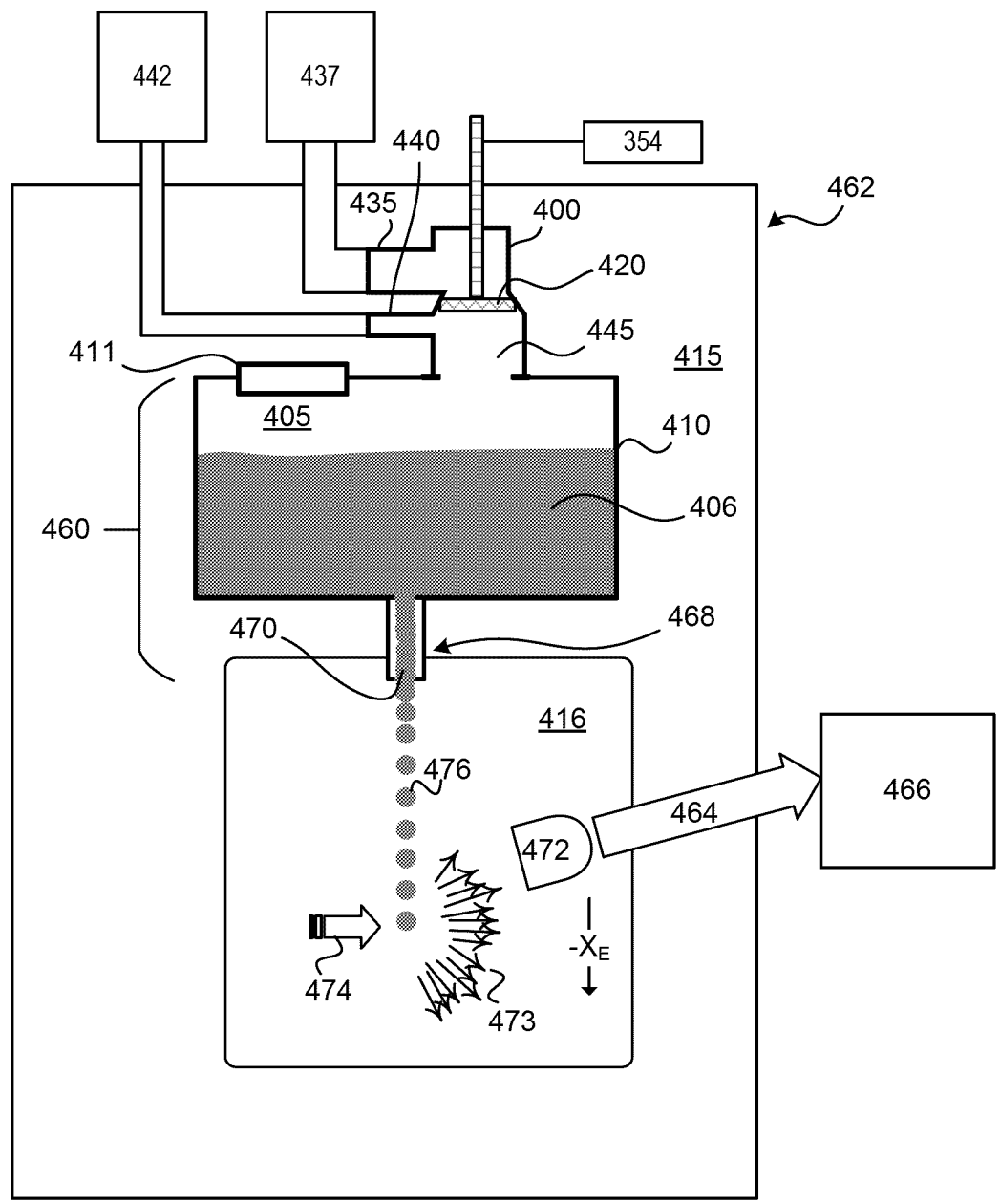
FIG. 4 is a block diagram of a target apparatus of an extreme ultraviolet (EUV) light source in which a fluid control device that can be the fluid control device of FIGS. 1A and 1B is used in the target apparatus.

Referring to FIG. 4, in some implementations, a fluid control device 400 (which can be the fluid control device 100 or 300) is used in a target apparatus 460 of an extreme ultraviolet (EUV) light source 462 that supplies EUV light 464 to an output apparatus 466 (which can be a photolithography apparatus). The target apparatus 460 includes one or more fluid devices for holding or moving target material 406.

In the implementation of FIG. 4, the target apparatus 460 includes a single reservoir 410. In other implementations, it is possible for the target apparatus 460 to include a plurality of reservoirs and one or more tanks for storage of fluid. A reservoir 410 is basically a pressure-controlled vessel into which target material 406 is placed and thereafter used by the EUV light source 462. The reservoir 410 can be formed of forged molybdenum or other suitable low-outgassing materials.

The target apparatus 460 includes the reservoir 410, which defines a hollow interior 405 configured to contain the target material that produces EUV light when in a plasma state, and a nozzle structure 468 defining an opening 470 that is in fluid communication with the hollow interior 405 and opens into an interior 416 of a vacuum chamber. The target apparatus 460 includes the fluid control device 400, which is hermetically sealed to the reservoir 410. The fluid control device 400 is designed like the fluid control devices 100, 300, and thus includes three fluid ports, a first fluid port fluidly coupled to the vacuum pump 437, a second fluid port fluidly coupled to the fluid supply 442, and the third fluid port 445 fluidly coupled to the reservoir interior 405. The fluid control device 400 also includes the single plunger valve 420 within the valve cavity and configured to move between first and second modes without opening the reservoir interior 405. The reservoir 410 can include a cover or port 411 that is removable to enable fresh target material (in solid form) to be added to the interior 405. When the cover or port 411 is removed from the reservoir 410, the interior 405 of the reservoir 410 is exposed to contaminants and atmospheric pressure that may be present in the environment 415.

Aspects of the EUV light source 462 are described next. The EUV light source 462 includes an EUV light collector 472 arranged relative to a target space at which one or more radiation pulses 474 interact with targets 476 that are ejected or forced out of the nozzle structure 468 under control of the pressure within the reservoir interior 405. The EUV light collector 472 collects the EUV light 473 that is emitted from the plasma that is formed from the interaction of the radiation pulses 474 with the target 476.

Each of the targets 476 is made up of the target material (supplied to the reservoir interior 405). The targets 476 are converted at least partially to plasma through their interaction with the radiation pulses 474. The targets 476 can be in the form of a droplet of liquid or molten metal, a portion of a liquid stream, solid particles or clusters, solid particles contained within liquid droplets, a foam of target material, or solid particles contained within a portion of a liquid stream. The target material 406 can include for example, water, tin, lithium, xenon, or any material that, when converted to a plasma state, has an emission line in the EUV range. For example, the target material 406 can be the element tin, which can be used as pure tin (Sn); as a tin compound such as SnBr4, SnBr2, SnH4; as a tin alloy such as tin-gallium alloys, tin-indium alloys, tin-indium-gallium alloys, or any combination of these alloys.

In use, the hollow interior 405 can be maintained at a pressure above 10 megapascals (MPa) when the plunger valve 420 is in the pressure mode (which is the mode that is shown in FIG. 4). Moreover, when the plunger valve 420 is in the pressure mode (as shown in FIG. 4), the pressure within the hollow interior 405 of the reservoir 410 is greater than a pressure within the interior 416 of the vacuum chamber. In this way, the stream of targets 476 is forced out of the nozzle structure 468 and directed toward the target space.

Because the fluid control device 400 uses only a single plunger valve 420 for both modes of operation (vacuum mode and high pressure mode), it can be designed with a smaller overall volume, and thus is easier to arrange relative to the reservoir 410 in the EUV light source 462, where space is limited. Moreover, because the fluid control device 400 is simple to use, and has a streamlined design, it is less expensive, lighter, and easier to maintain than prior systems that provide both vacuum and high pressure modes. Because the fluid control device 400 provides excellent and high fluid conductance while in the vacuum mode, the fluid control device 400 can be utilized after a restart of the target apparatus 460. A restart of the target apparatus 460 occurs after the hollow interior 405 of the reservoir 410 has been opened to atmospheric environment. By opening the hollow interior 405 of the reservoir 410, the hollow interior 405 can become contaminated with unwanted matter, and before the hollow interior 405 of the reservoir 410 can start operation again (to supply targets 476 to the target space), the hollow interior 405 must be de-contaminated, which may generally include an evacuation of the hollow interior 405, and this can be done with the fluid control device 400, which can perform the de-contamination at a must shorter time scale than prior systems.

Figure 5:
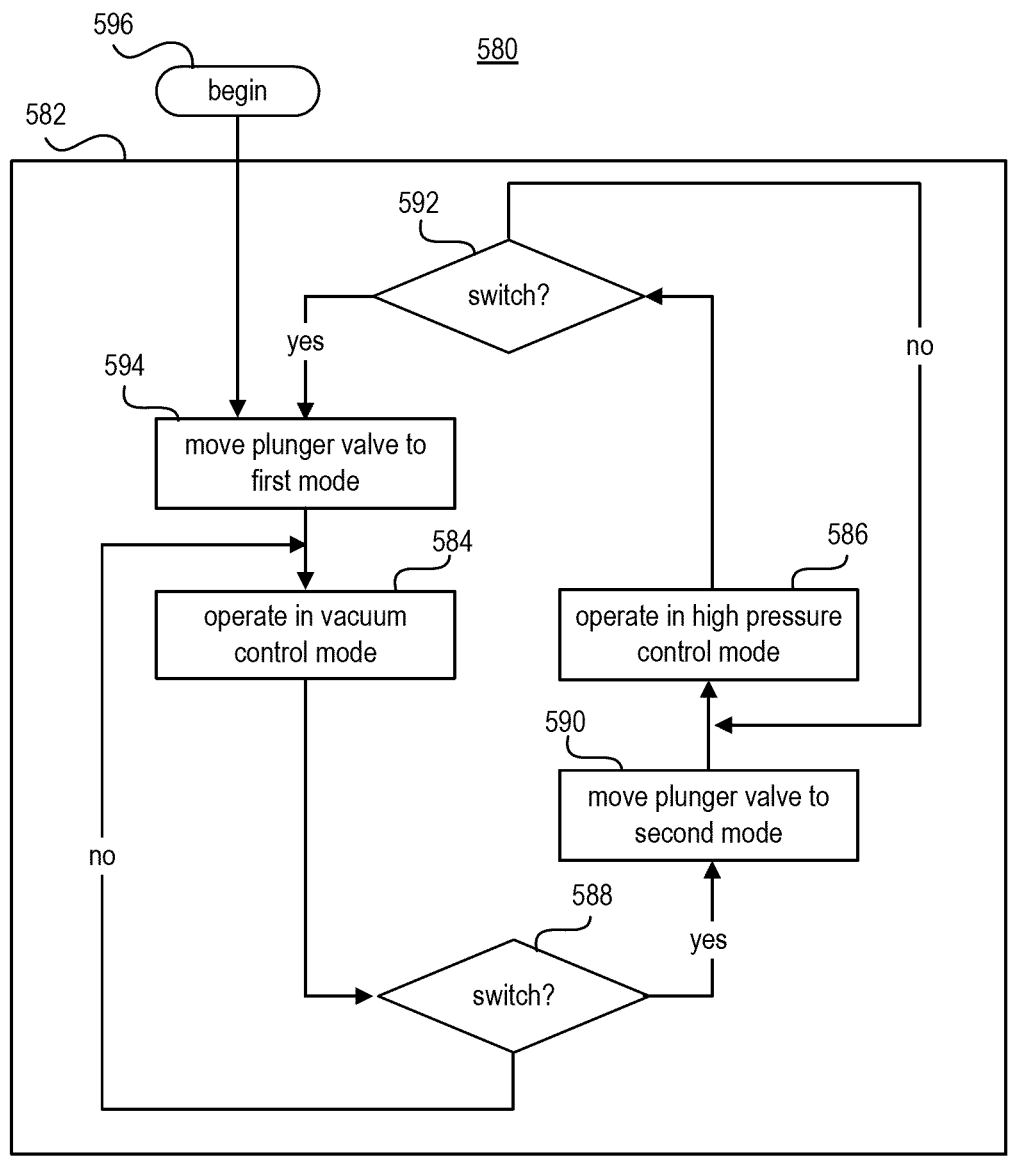
FIG. 5 is a flow chart of a procedure performed for controlling a fluid state within the hermetic interior of the body using the fluid control device of FIGS. 1A and 1B or FIGS. 2A-3C.

Referring to FIG. 5, a procedure 580 is performed for controlling a fluid state within the hermetic interior 105 of the body 110 using the fluid control device 100. Reference is made to the fluid control device 100 of FIG. 1 but the procedure 580 can be performed by the fluid control device 300 or 400. The procedure 580 can be halted whenever the hermetic interior 105 needs to be opened to the environment.

The procedure 580 includes controlling the fluid state in the hermetic interior 105 using one of two operationally-isolated control modes (582). The two control modes include the first mode, which is the vacuum control mode (584), and the second mode, which is the high pressure control mode (586). In the vacuum control mode (584), fluid is conducted from the hermetic interior 105 of the body 110 at the first conductance such that the hermetic interior 105 reaches a target vacuum pressure $P_{TV}$. The target vacuum pressure $P_{TV}$ is below atmospheric pressure, and thus is below about 101.325 kilopascals (kPa). In the high pressure control mode (586), fluid is conducted into the hermetic interior 105 of the body 110 at the second conductance such that the hermetic interior 105 reaches a target high pressure $P_{TH}$. The target high pressure $P_{TH}$ is above atmospheric pressure, and thus is above about 101.325 kilopascals (kPa). Moreover, as discussed above, the first conductance (which is through the first fluid port 135) larger than (for example, at least twice the size of) the second conductance (which is through the second fluid port 140).

The procedure 580 includes switching between the vacuum control mode (584) and the high pressure control mode (586).

If current operation is the vacuum control mode (584), then there is a determination (588) as to whether the mode needs to be switched to the high pressure control mode (586). For example, if the pressure within the hermetic interior 105 has reached the target vacuum pressure $P_{TV}$, then the determination may be that the mode needs to be switched. As another example, the determination (588) for when to switch to the high pressure control mode (586) could be based on another aspect of the hermetic interior 105, such as a concentration of matter within the hermetic interior 105. The determination (588) as to whether to switch to high pressure control mode (586) can be made by an operator or by a process implemented in software. The determination (588) can be based on measurements that are performed by sensors associated with the hermetic interior 105, and the result of the determination can be actuation of components of the fluid control device 100 or it can be a display or conveyance of values to the operator. As another example, the determination (588) for when to switch to the high pressure control mode (586) could be based on a control signal that is triggered or initiated, for example, by an assessment that a de-contamination procedure has been concluded, or an assessment that high-pressure operations are ready to commence, or other factors, or combinations thereof.

If the mode does not need to be switched from vacuum control mode (584) to high pressure control mode (586) (588), then the vacuum control mode (584) continues. If the mode does need to be switched from vacuum control mode (584) to high pressure control mode (586) (588), then the plunger valve 130 is moved from the first mode corresponding to the vacuum control mode (584) in which the plunger valve 130 is open to the second mode corresponding to the high pressure control mode (586) in which the plunger valve 130 is closed and forms the seal 132 (590). For example, and with reference to FIGS. 3A and 3B, the actuator 352 can be moved under control of the control device 354 along the Z direction, and the motion of the actuator 352 causes the plunger valve 330 to be moved along the Z direction. During this movement (590), the hermetic interior 105 of the body 110 is maintained.

The seal 132 that is formed (590) separates the vacuum pump 137 from the hermetic interior 105. The seal 132 is formed (590) prior to conducting the fluid into the hermetic interior 105 from the fluid supply 142 during operation of the high pressure control mode (586). Moreover, the plunger valve 130 is exposed to the higher pressure (and ultimately the target high pressure $P_{TH}$ when that is reached) while the fluid is conducted into the hermetic interior 105 of the body 110.

If current operation is the high pressure control mode (586), then there is a determination (592) as to whether the mode needs to be switched to the vacuum control mode (584). The determination (592) can be externally driven by other system usage, needs, and controls (such as related to the hermetic interior 105. For example, the determination (592) can occur at the end of an operation cycle or in the event of a pressure leak from the hermetic interior 105. If the mode does not need to be switched from high pressure control mode (586) to vacuum control mode (584) (592), then high pressure control mode (586) continues. If the mode does need to be switched from high pressure control mode (586) to vacuum control mode (584) (592), then the plunger valve 130 is moved from the second mode corresponding to the high pressure control mode (586) in which the plunger valve 130 is closed to the first mode corresponding to the vacuum control mode (584) in which the plunger valve 130 is open (594). For example, and with reference to FIGS. 3A and 3B, the actuator 352 can be moved along the −Z direction under control of the control device 354 and the motion of the actuator 352 causes the plunger valve 330 to be moved along the −Z direction. During this movement (594), the hermetic interior 105 of the body 110 is maintained.

The procedure 580 can begin (596) after the body 110 has been sealed to form the hermetic interior 105. At this beginning state, in some implementations, the hermetic interior 105 is first pumped down to the target vacuum pressure $P_{TV}$ during vacuum control mode (584) in order to remove any contaminants that were in the hermetic interior 105 due to it previously being opened to environment.

Depending on the design of the hermetic interior 105 and the body 110, fluid is conducted from the hermetic interior 105 of the body 110 after switching to the vacuum control mode (584) or after beginning (596) such that the hermetic interior 105 of the body 110 reaches the target vacuum pressure $P_{TV}$ in less than four hours, less than an hour, less than 15 minutes, or less than a minute.

Thus, for example, with reference to the fluid control device 400 of FIG. 4, the procedure 580 begins operation in vacuum control mode (584) after the hollow interior 405 is sealed off from the environment 415. Because the fluid control device 400 includes a first fluid port 435 that has a much larger conductance than the second fluid port 440, it is possible to reach the target vacuum pressure $P_{TV}$ in a relatively rapid fashion, for example, in a few minutes or even less than a minute.

Figure 6A:
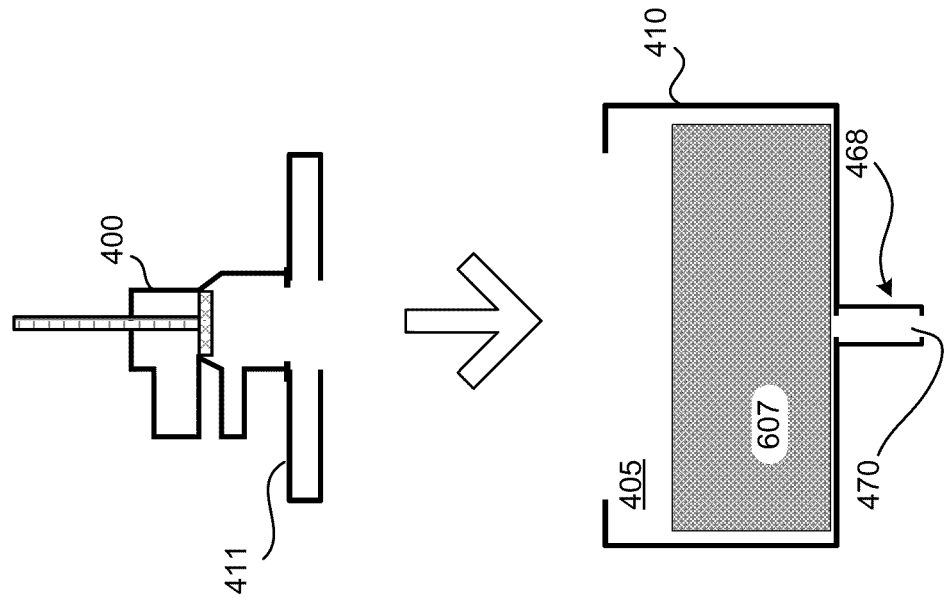
FIGS. 6A-6F show steps of a procedure performed for controlling a fluid state within a hollow interior of a reservoir of the target apparatus of FIG. 4.
Figure 6B:
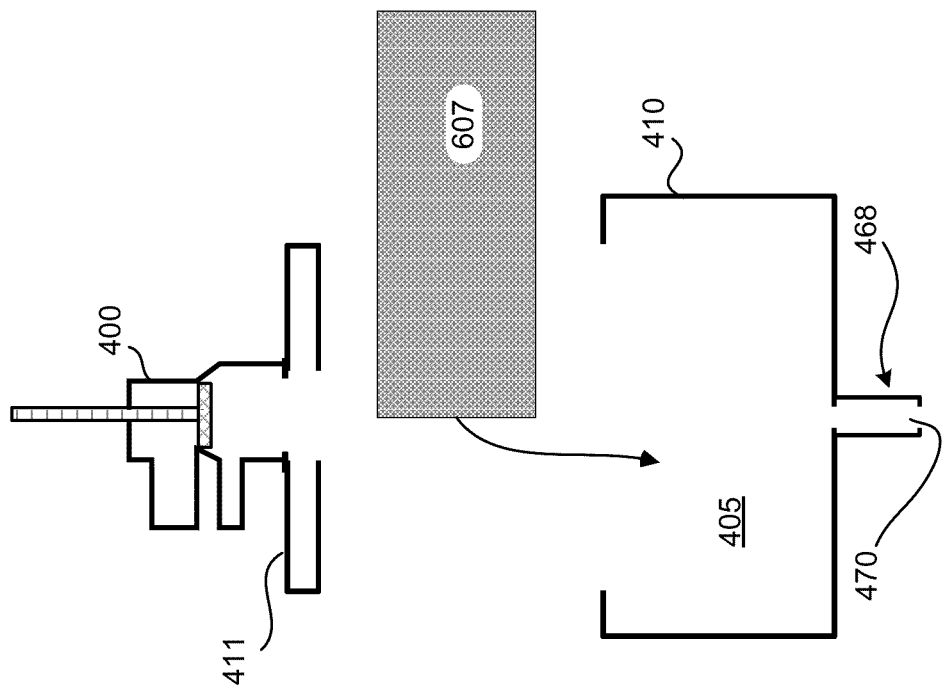
Figure 6D:
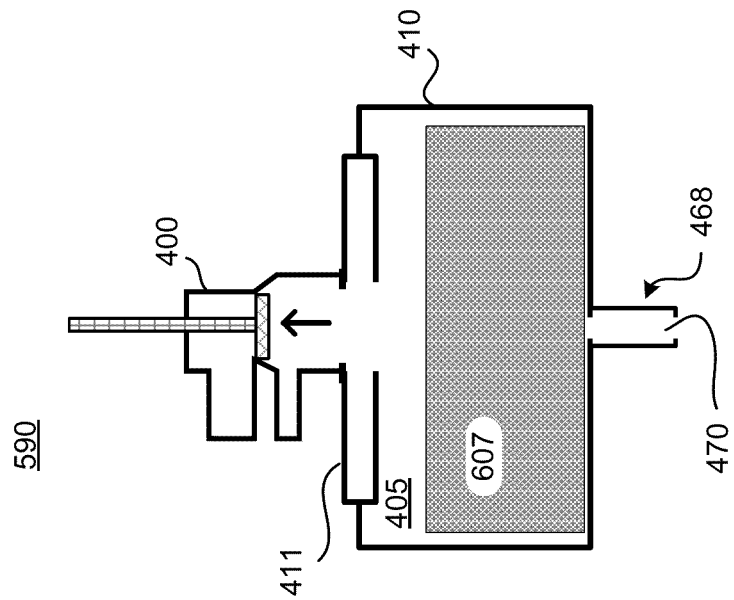
Figure 6C:
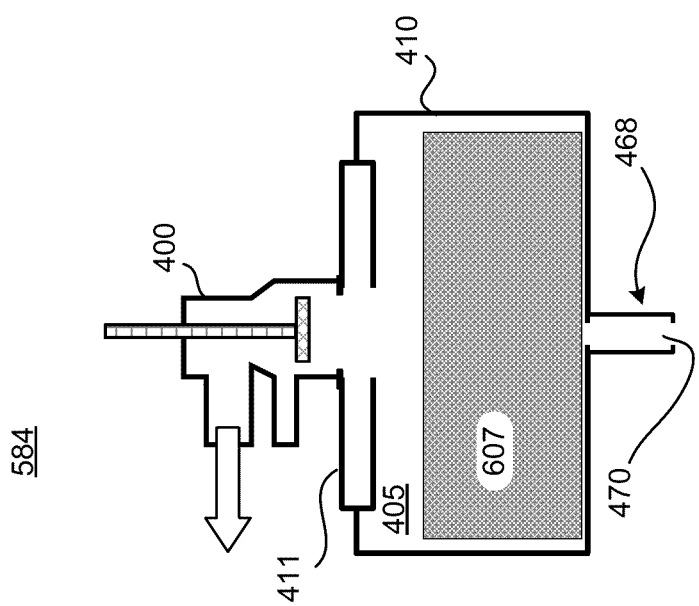

Specifically, and with reference to FIGS. 6A-6F, prior to the hollow interior 405 being sealed off from the environment 415 and also prior to operation in vacuum control mode (584), a solid mass 607 of target material 406 is inserted into the interior 405 of the reservoir 410 after the cover 411 has been removed (FIG. 6A). In this particular implementation, the fluid control device 400 is integrated within the cover 411, although it is alternatively possible for the fluid control device 400 to be integrated into a wall of the reservoir 410. The cover 411 is replaced (FIG. 6B) and the cover 411 and fluid control device 400 are sealed to the reservoir 410 to form the hollow interior 405. Next, because the hollow interior 405 was previously opened to the environment 415 and contaminants may be present within the hollow interior 405, the procedure 580 beings controlling the fluid state in the hollow interior 405 by first conducting fluid that includes one or more contaminants out of the hollow interior 405 while operating in vacuum control mode 584 using the vacuum pump 437 (FIG. 6C).

Figure 6F:
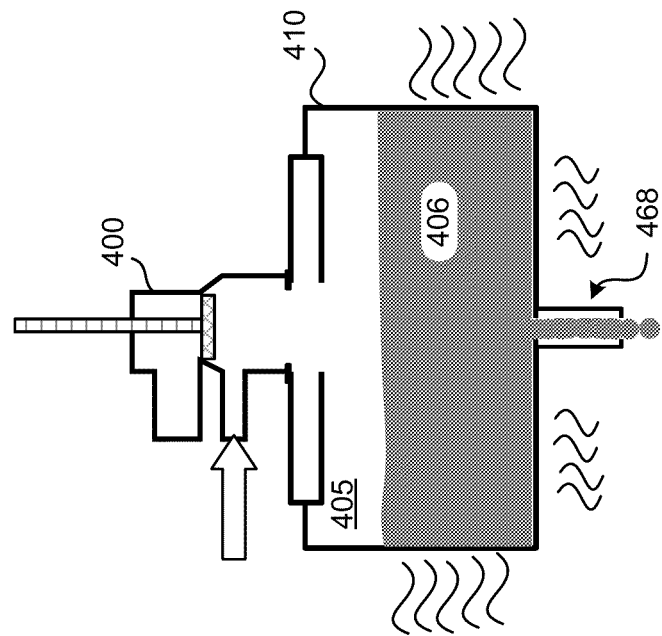
Figure 6E:
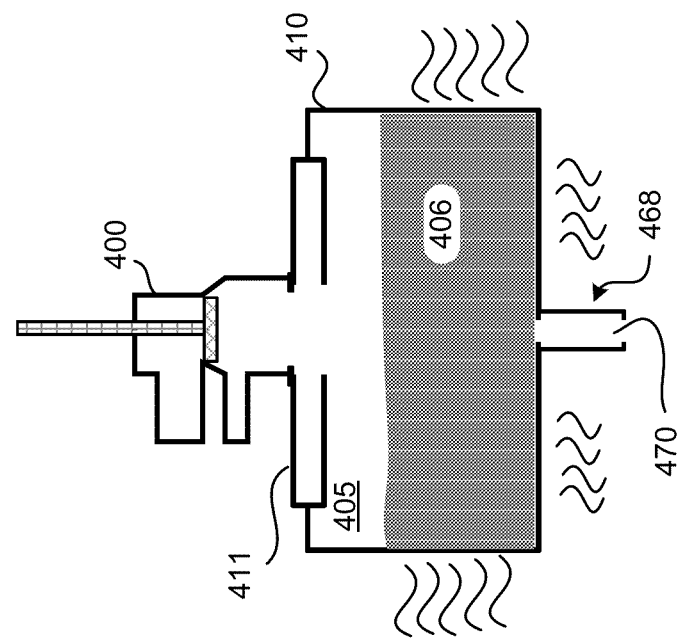

Once the concentration of each contaminant inside the hollow interior 405 drops below a respective threshold concentration, then vacuum control mode (584) is halted, the plunger valve 420 is closed (590) (FIG. 6D), and the solid mass 607 of target material 406 is melted (FIG. 6E). The fluid control device 400 operates in high pressure control mode (586) after the target material 406 has been melted by conducting fluid into the hollow interior 405 from the fluid source 442 (FIG. 6F). Once the pressure within the hollow interior 405 rises above a target high pressure $P_{TH}$, the melted target material 406 viscously flows through the opening 470 of the nozzle structure 468 and into the interior 416 of the vacuum chamber.

Figure 7:
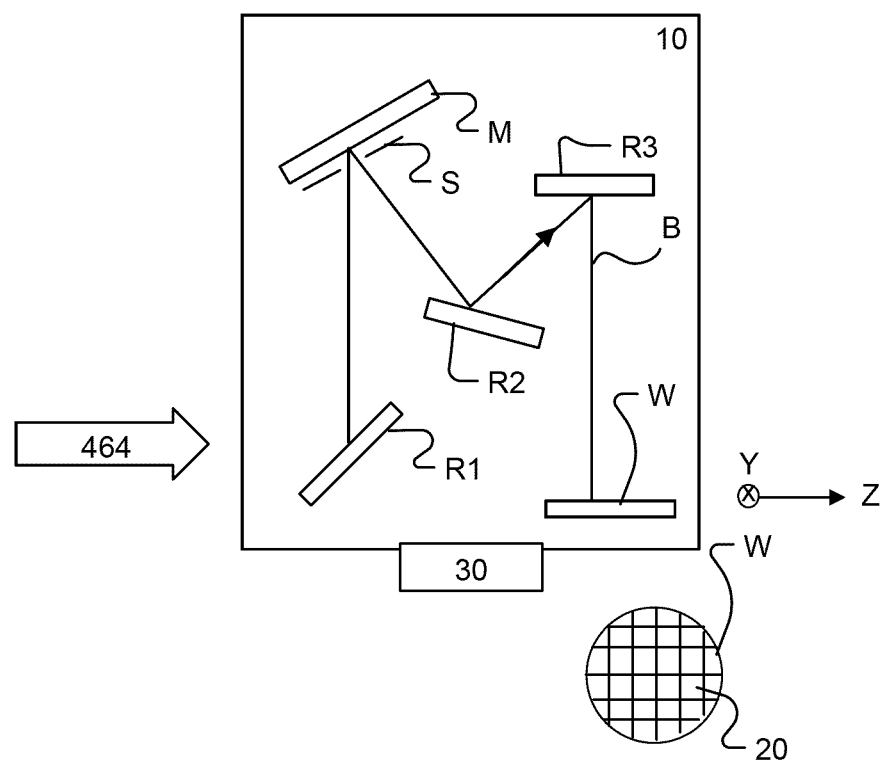
FIG. 7 is a block diagram of an implementation of a lithography apparatus that receives EUV light output from the EUV light source of FIG. 4.

Referring to FIG. 7, an implementation 766 of the lithography apparatus 466 is shown. The lithography apparatus 766 exposes a substrate (which can be referred to as a wafer) W with an exposure beam B. The lithography apparatus 766 includes a plurality of reflective optical elements R1, R2, R3, a mask M, and a slit S, all of which are in an enclosure 10. The enclosure 10 is a housing, tank, or other structure that is capable of supporting the reflective optical elements R1, R1, R2, the mask M, and the slit S, and is also capable of maintaining an evacuated space within the enclosure 10.

The EUV light 464 enters the enclosure 10 and is reflected by the optical element R1 through the slit S toward the mask M. The slit S partly defines the shape of the distributed light used to scan the substrate W in a lithography process. The dose delivered to the substrate W or the number of photons delivered to the substrate W depends on the size of the slit S and the speed at which the slit S is scanned.

The mask M also may be referred to as a reticle or patterning device. The mask M includes a spatial pattern that represents the features that are to be formed in a photoresist on a substrate W. The EUV light 464 interacts with the mask M. The interaction between the EUV light 364 and the mask M results in the pattern of the mask M being imparted onto the EUV light 464 to form the exposure beam B. The exposure beam B passes through the slit S and is directed to the substrate W by the optical elements R2 and R3. An interaction between the substrate W and the exposure beam B exposes the pattern of the mask M onto the substrate W, and the photoresist features are thereby formed at the substrate W. The substrate W includes a plurality of portions 20 (for example, dies). The area of each portion 20 in the Y-Z plane is less than the area of the entire substrate W in the Y-Z plane. Each portion 20 may be exposed by the exposure beam B to include a copy of the mask M such that each portion 20 includes the electronic features indicated by the pattern on the mask M.

The lithography apparatus 766 can include a lithography control system 30 that is in communication with a control apparatus (not shown) of the EUV light source 462.

Other aspects of the invention are set out in the following numbered clauses.

1. A two-mode fluid control device comprising:
    a structure defining a valve cavity and three fluid ports fluidly coupled to the valve cavity, a first fluid port configured to be fluidly coupled to a vacuum pump, a second fluid port configured to be fluidly coupled to a fluid supply, and a third fluid port configured to be fluidly coupled to a hermetic interior of a body; and
    a single plunger valve within the valve cavity and configured to move between first and second modes while maintaining the hermetic interior of the body;
    wherein the first mode corresponds to a vacuum mode in which the plunger valve is open such that a first fluid flow path is open between the hermetic interior and the first fluid port and fluid is free to pass between the first fluid port and the hermetic interior and the second mode corresponds to a pressure mode in which the plunger valve is closed such that the first fluid port is blocked from the hermetic interior by the plunger valve and a second fluid flow path is open between the hermetic interior and the second fluid port.

2. The two-mode fluid control device of clause 1, wherein the first fluid port has a first cross-sectional area that provides a first fluid conductance and the second fluid port has a second cross-sectional area that provides a second fluid conductance, the first cross-sectional area being greater than the second cross-sectional area.

3. The two-mode fluid control device of clause 2, wherein the first cross-sectional area is at least twice the size of, at least five times the size of, at least ten times the size of, at least fifty times the size of, or about one hundred times the size of the second cross-sectional area.

4. The two-mode fluid control device of clause 1, wherein the second mode is a default mode in which the plunger valve is at its equilibrium position.

5. The two-mode fluid control device of clause 4, further comprising a biasing device in physical communication with the plunger valve and configured to bias the plunger valve to the second mode.

6. The two-mode fluid control device of clause 1, wherein, when the plunger valve is in the second mode and is closed, a seal is formed that separates the vacuum pump from the hermetic interior and the plunger valve is exposed to a pressure above atmospheric pressure.

7. The two-mode fluid control device of clause 6, wherein the seal strengthens or remains constant while the plunger valve is in the second mode due to pressure applied against the plunger valve from the fluid supply.

8. The two-mode fluid control device of clause 1, wherein, in the vacuum mode, a pressure within the hermetic interior is held below atmospheric pressure, and in the pressure mode, a pressure within the hermetic interior is held above atmospheric pressure.

9. The two-mode fluid control device of clause 1, wherein, in the vacuum mode, a pressure within the hermetic interior is held at high or ultra-high vacuum in which molecular flow dominates within first fluid flow path and the hermetic interior.

10. The two-mode fluid control device of clause 1, wherein, in the vacuum mode, a pressure within the hermetic interior is held below 101 kilopascals (kPa), and in the pressure mode, a pressure within the hermetic interior is held above 10 megapascals (MPa).

11. The two-mode fluid control device of clause 1, wherein, when the plunger valve is in the first mode, fluid is free to pass from the hermetic interior to the vacuum pump.

12. The two-mode fluid control device of clause 1, wherein the plunger valve is configured to move between the first and second modes by linearly translating between the first and second modes without rotation.

13. The two-mode fluid control device of clause 12, further comprising an actuator in physical communication with the plunger valve and configured to control the translation of the plunger valve between the first and second modes.

14. The two-mode fluid control device of clause 13, wherein the actuator comprises a rotatable threaded rod, a push/pull bar, a cable, a lever, a piston, or a solenoid.

15. The two-mode fluid control device of clause 1, wherein a hermetic seal is formed between the structure and the body.

16. The two-mode fluid control device of clause 1, wherein the second fluid port is fluidly coupled to a fluid supply of gas.

17. The two-mode fluid control device of clause 16, wherein the gas is an inert gas that includes one or more of a noble gas and a molecular gas.

18. The two-mode fluid control device of clause 1, wherein:
while in the first mode, a first fluid volume that includes the hermetic interior and a first portion of the valve cavity is formed; and
while in the second mode, a second fluid volume that includes the hermetic interior and a second portion of the valve cavity is formed, the second fluid volume being smaller than the first fluid volume.

19. The two-mode fluid control device of clause 1, wherein the plunger valve is a solid volume such that any fluid flow path remains exterior to the plunger valve.

20. A target apparatus for an extreme ultraviolet (EUV) light source, the target apparatus comprising:
a target generator comprising a reservoir defining a hollow interior configured to contain target material that produces EUV light when in a plasma state and a nozzle structure defining an opening that is in fluid communication with the hollow interior; and
a two-mode valve device hermetically sealed to the reservoir, the two-mode valve device comprising:
a structure defining a valve cavity and three fluid ports fluidly coupled to the valve cavity, a first fluid port of a first extent being fluidly coupled to a vacuum pump, a second fluid port of a second extent being fluidly coupled to a fluid supply, the first extent being at least ten times the size of the second extent, and a third fluid port being fluidly coupled to the reservoir interior; and
a single plunger valve within the valve cavity and configured to move between first and second modes without opening the reservoir interior, the first mode corresponding to a vacuum mode in which the plunger valve is open such that a first fluid flow path is open between the reservoir interior and the first fluid port and the second mode corresponding to a pressure mode in which the plunger valve is closed such that a second fluid flow path is open between the reservoir interior and the second fluid port.

21. The apparatus of clause 20, wherein the hollow interior is held at a pressure above 10 megapascals (MPa) when the plunger valve is in the pressure mode.

22. The apparatus of clause 21, wherein when the plunger valve is in the pressure mode, the pressure within the hollow interior of the reservoir is greater than a pressure at the exterior.

23. The apparatus of clause 20, wherein a pressure within the hollow interior is controlled at least in part by the mode of the two-mode valve device.

24. The target apparatus of clause 20, wherein the first fluid port is hermetically separated from the hollow interior by the plunger valve when the plunger valve is in the second mode.

25. A method comprising:
controlling a fluid state in a hermetic interior of a body using one of two operationally-isolated control modes, the two control modes including a vacuum control mode and a high pressure control mode;
in the vacuum control mode, conducting fluid from the hermetic interior of the body at a first conductance such that the hermetic interior reaches a target vacuum pressure;
in the high pressure control mode, conducting fluid into the hermetic interior of the body at a second conductance such that the hermetic interior reaches a target high pressure that is above atmospheric pressure, the first conductance being at least twice the second conductance; and switching between the vacuum control mode and the high pressure control mode including moving a single plunger valve between a first mode corresponding to the vacuum control mode in which the plunger valve is open and a second mode corresponding to the high pressure control mode in which the plunger valve is closed and forms a seal, wherein the hermetic interior of the body is maintained throughout the switching.

26. The method of clause 25, further comprising, prior to conducting fluid into the hermetic interior of the body at the second rate of flow while in the high pressure control mode, forming the seal to thereby separate a vacuum pump from the hermetic interior.

27. The method of clause 26, wherein conducting fluid into the hermetic interior of the body at the second rate of flow while in the high pressure control mode comprises exposing the plunger valve to the target high pressure.

28. The method of clause 25, wherein the target vacuum pressure is below 101 kilopascals (kPa) and fluid is conducted from the hermetic interior of the body after switching to the vacuum control mode at the first conductance such that the hermetic interior of the body reaches the target vacuum pressure in less than four hours, less than an hour, less than 15 minutes, or less than a minute.

29. The method of clause 25, wherein:

switching to the vacuum control mode comprises opening the plunger valve and forming a first fluid volume that includes the hermetic interior and a first portion of a valve cavity in which the plunger valve is seated; and switching to the high pressure control mode comprises closing the plunger valve and forming a second fluid volume that includes the hermetic interior and a second portion of the valve cavity, the second fluid volume being smaller than the first fluid volume.

30. The method of clause 25, wherein, prior to controlling the fluid state in the hermetic interior of the body, inserting a solid mass of material into an interior of the body and sealing the interior to form the hermetic interior in which the solid mass is located, and controlling the fluid state in the hermetic interior of the body comprises:

in the vacuum control mode, conducting fluid that includes one or more contaminants from the hermetic interior;

if the concentration of each contaminant inside the hermetic interior is below a respective threshold concentration, then closing the plunger valve to halt vacuum control mode, melting the solid mass of material, and switching to high pressure control mode after the solid mass of material has melted.

31. The method of clause 30, wherein, during high pressure control mode, fluid is conducted into the hermetic interior until a pressure in the hermetic interior rises above a threshold pressure at which the melted target material viscously flows out of an opening fluidly coupled to the hermetic interior.

32. The method of clause 25, further comprising biasing the plunger valve to the second state.

33. The method of clause 25, wherein the first conductance is at least five times, at least ten times, at least fifty times, or about one hundred times the second conductance.

What is claimed is:

1. A two-mode fluid control device comprising:
a structure defining a valve cavity and three fluid ports fluidly coupled to the valve cavity, a first fluid port configured to be fluidly coupled to a vacuum pump, a second fluid port configured to be fluidly coupled to a fluid supply, and a third fluid port configured to be fluidly coupled to a hermetic interior of a body; and
a single plunger valve within the valve cavity and configured to move between first and second modes while maintaining the hermetic interior of the body;
wherein the first mode corresponds to a vacuum mode in which the plunger valve is open such that a first fluid flow path is open between the hermetic interior and the first fluid port and fluid is free to pass between the first fluid port and the hermetic interior; and
wherein the second mode corresponds to a pressure mode in which the plunger valve is closed such that the first fluid port is blocked from the hermetic interior by the plunger valve, a second fluid flow path is open between the hermetic interior and the second fluid port, and the hermetic interior reaches a target high pressure that is above atmospheric pressure.

2. The two-mode fluid control device of claim 1, wherein the first fluid port has a first cross-sectional area that provides a first fluid conductance and the second fluid port has a second cross-sectional area that provides a second fluid conductance, the first cross-sectional area being greater than the second cross-sectional area.

3. The two-mode fluid control device of claim 1, wherein the second mode is a default mode in which the plunger valve is at its equilibrium position.

4. The two-mode fluid control device of claim 3, further comprising a biasing device in physical communication with the plunger valve and configured to bias the plunger valve to the second mode.

5. The two-mode fluid control device of claim 1, wherein, when the plunger valve is in the second mode and is closed, a seal is formed that separates the vacuum pump from the hermetic interior and the plunger valve is exposed to a pressure above atmospheric pressure.

6. The two-mode fluid control device of claim 5, wherein the seal strengthens or remains constant while the plunger valve is in the second mode due to pressure applied against the plunger valve from the fluid supply.

7. The two-mode fluid control device of claim 1, wherein, in the vacuum mode, a pressure within the hermetic interior is held at high or ultra-high vacuum in which molecular flow dominates within first fluid flow path and the hermetic interior.

8. The two-mode fluid control device of claim 1, wherein the plunger valve is configured to move between the first and second modes by linearly translating between the first and second modes without rotation.

9. The two-mode fluid control device of claim 8, further comprising an actuator in physical communication with the plunger valve and configured to control the translation of the plunger valve between the first and second modes.

10. The two-mode fluid control device of claim 9, wherein the actuator comprises a rotatable threaded rod, a push/pull bar, a cable, a lever, a piston, or a solenoid.

11. The two-mode fluid control device of claim 1, wherein the second fluid port is fluidly coupled to a fluid supply of gas.

12. The two-mode fluid control device of claim 1, wherein:

while in the first mode, a first fluid volume that includes the hermetic interior and a first portion of the valve cavity is formed; and while in the second mode, a second fluid volume that includes the hermetic interior and a second portion of the valve cavity is formed, the second fluid volume being smaller than the first fluid volume.

13. A target apparatus for an extreme ultraviolet (EUV) light source, the target apparatus comprising:

a target generator comprising a reservoir defining a hollow interior configured to contain target material that produces EUV light when in a plasma state and a nozzle structure defining an opening that is in fluid communication with the hollow interior; and a two-mode valve device hermetically sealed to the reservoir, the two-mode valve device comprising:

a structure defining a valve cavity and three fluid ports fluidly coupled to the valve cavity, a first fluid port being fluidly coupled to a vacuum pump, a second fluid port being fluidly coupled to a fluid supply, and a third fluid port being fluidly coupled to the reservoir interior; and a single plunger valve within the valve cavity and configured to move between first and second modes without opening the reservoir interior, the first mode corresponding to a vacuum mode in which the plunger valve is open such that a first fluid flow path is open between the reservoir interior and the first fluid port and the second mode corresponding to a pressure mode in which the plunger valve is closed such that a second fluid flow path is open between the reservoir interior and the second fluid port and the reservoir interior reaches a target high pressure that is above atmospheric pressure.

14. The apparatus of claim 13, wherein the hollow interior is held at a pressure above 10 megapascals (MPa) when the plunger valve is in the pressure mode.

15. The apparatus of claim 13, wherein a pressure within the hollow interior is controlled at least in part by the second mode of the two-mode valve device.

16. The target apparatus of claim 13, wherein the first fluid port is hermetically separated from the hollow interior by the plunger valve when the plunger valve is in the second mode.

17. A method comprising:

controlling a fluid state in a hermetic interior of a body using one of two operationally-isolated control modes, the two control modes including a vacuum control mode and a high pressure control mode;

in the vacuum control mode, conducting fluid from the hermetic interior of the body at a first conductance such that the hermetic interior reaches a target vacuum pressure;

in the high pressure control mode, conducting fluid into the hermetic interior of the body at a second conductance such that the hermetic interior reaches a target high pressure that is above atmospheric pressure, the first conductance being at least twice the second conductance; and switching between the vacuum control mode and the high pressure control mode including moving a single plunger valve between a first mode corresponding to the vacuum control mode in which the plunger valve is open and a second mode corresponding to the high pressure control mode in which the plunger valve is closed and forms a seal, wherein the hermetic interior of the body is maintained throughout the switching.

18. The method of claim 17, further comprising, prior to conducting fluid into the hermetic interior of the body at the second rate of flow while in the high pressure control mode, forming the seal to thereby separate a vacuum pump from the hermetic interior.

19. The method of claim 18, wherein conducting fluid into the hermetic interior of the body at the second rate of flow while in the high pressure control mode comprises exposing the plunger valve to the target high pressure.

20. The method of claim 17, wherein:

switching to the vacuum control mode comprises opening the plunger valve and forming a first fluid volume that includes the hermetic interior and a first portion of a valve cavity in which the plunger valve is seated; and switching to the high pressure control mode comprises closing the plunger valve and forming a second fluid volume that includes the hermetic interior and a second portion of the valve cavity, the second fluid volume being smaller than the first fluid volume.

21. The method of claim 17, wherein, prior to controlling the fluid state in the hermetic interior of the body, inserting a solid mass of material into an interior of the body and sealing the interior to form the hermetic interior in which the solid mass is located, and controlling the fluid state in the hermetic interior of the body comprises:

in the vacuum control mode, conducting fluid that includes one or more contaminants from the hermetic interior;

if the concentration of each contaminant inside the hermetic interior is below a respective threshold concentration, then closing the plunger valve to halt vacuum control mode, melting the solid mass of material, and switching to high pressure control mode after the solid mass of material has melted.

22. The method of claim 21, wherein, during high pressure control mode, fluid is conducted into the hermetic interior until a pressure in the hermetic interior rises above a threshold pressure at which the melted target material viscously flows out of an opening fluidly coupled to the hermetic interior.

23. The method of claim 17, further comprising biasing the plunger valve to the second state.

* * * * *